United States Patent [19]

Bergquist

[11] Patent Number: 4,754,332
[45] Date of Patent: Jun. 28, 1988

[54] DEVICE FOR PRESENTING AND SELECTIVELY ALTERING THE BRIGHTNESS OF A DIGITIZED IMAGE

[75] Inventor: Folke Bergquist, Hindas, Sweden

[73] Assignee: Victor Hasselblad AB, Gothenburg, Sweden

[21] Appl. No.: 914,177

[22] Filed: Oct. 1, 1986

[30] Foreign Application Priority Data

Oct. 7, 1985 [SE] Sweden .............................. 8504630

[51] Int. Cl.$^4$ ............................................. H04N 5/14
[52] U.S. Cl. ................................... 358/168; 358/284; 382/27
[58] Field of Search ................... 358/93, 168, 280, 22, 358/87, 166, 107, 108, 284; 340/709, 711, 712; 382/19, 27

[56] References Cited

U.S. PATENT DOCUMENTS

| | | | |
|---|---|---|---|
| 3,257,506 | 6/1966 | Siepmann | 358/168 X |
| 3,936,800 | 2/1976 | Ejiri et al. | 382/27 |
| 4,021,607 | 5/1977 | Amano | 358/230 X |
| 4,589,140 | 5/1986 | Bishop et al. | 382/27 X |
| 4,654,722 | 3/1987 | Alkofer | 358/280 X |

Primary Examiner—Howard W. Britton
Assistant Examiner—Victor R. Kostak

[57] ABSTRACT

To alter the brightness of selected portions of an image a representation of the image is presented on a display and is stored in a memory. The image representation is divided into a number of fields. A user may select an arbitrary one of the fields and indicate a desired change in its brightness, as presented on the display, by means of a field selector and correction keys. Each such change is also registered as a change in values stored in a corresponding region of the memory. Using interpolation, a control unit automatically modifies the brightness level of non-central portions of the selected image field, and of image fields adjacent to it, in order to eliminate sharp and obvious transitions in brightness at the borders of the respective fields.

2 Claims, 4 Drawing Sheets

DEVICE FOR PRESENTING AND SELECTIVELY ALTERING THE BRIGHTNESS OF A DIGITIZED IMAGE

BACKGROUND OF THE INVENTION

In many contexts one may desire to scan images in order to form an electric signal. The signal can be used for long-distance transmission of the images, for presentation using media such as electronic displays and for use in electrotyping, to name just a few possibilities.

The image often consists of a photographic picture. Because of the limited exposure latitude of the photographic film, that is to say, its ability to correctly render a wide range of illumination intensity, photographic images of subjects with greatly varying illumination intensity are rendered in such a way that dark shadows and brightly iluminated sections become, respectively, too dark or too light even when the exposure setting is correct for certain other sections.

When enlarging a negative material onto a light-sensitive positive material it is possible to correct unevenness in the exposure by shading certain sections such that during a portion of the exposure time one holds a shading object in the light path from the thinnest sections of the negative. One moves the object, which can be a hand or some suitably cut piece of paper, so that sharp contours will not be formed on the enlargement.

In order to achieve a corresponding correction ability it is previously known that, during electronic processing of images, the produced signal may be used to generate an electronic representation of the image on a display, such as a cathode ray tube (CRT). In this way one may determine whether the brightness of a particular section needs to be increased or decreased in order to bring out the details even in the dark shadows or to prevent the brightest sections from being washed out. It is previously known that one may utilize a light pen, for example, with which one may ring in one the display the regions which are to be corrected and give a suitable manoeuvre signal for this correction. However, this method for correcting the degree of illumination of the images gives rise to delimited fields where the corrections have been made which do not run together smoothly with the rest of the picture. Said known method of correcting images which have been scanned in order to produce an electric signal does not therefore give a satisfactory result.

It is an object of the present invention to provide a device for correction of images which are represented in the form of an electric signal so that a better image representation than the original is achieved for dark or light sections, without discernible transitions between corrected and uncorrected sections.

BRIEF SUMMARY OF THE INVENTION

According to the invention, in order to alter the brightness of selected portions of an image a representation of the image is presented on a display and is stored in a memory. The image representation is divided into a number of fields. A user may select an arbitrary one of the fields and indicate a desired change in its brightness, as presented on the display, by means of a field selector and correction keys. Each such change is also registered as a change in values stored in a corresponding region of the memory. Using interpolation, a control unit automatically modifies the brightness level of non-central portions of the selected image field, and of image fileds adjacent to it, in order to eliminate sharp and obvious transitions in brightness at the borders of the respective fields.

BRIEF DESCRIPTION OF THE DRAWING

The invention is illustrated by way of example in the attached drawing, in which.

DETAILED DESCRIPTION OF PREFERRED EMBODIMENT(S)

Figure 1:
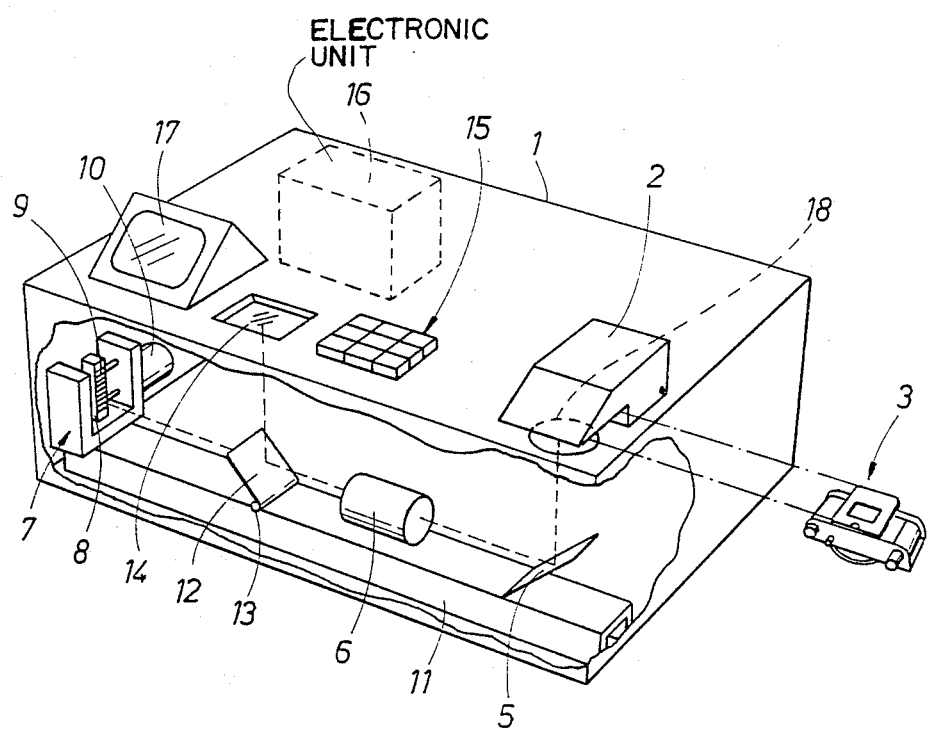
FIG. 1 shows a scanning device for images which can be constructed as a picture transmitter.

As may be seen in FIG. 1, an image transmitter contains on and in a casing 1 an illumination device 2, a picture holder 3 which is arranged in accordance with the invention, a mirror 5, an objective 6, a scanning device 7 with a picture window 8 and a row scanner 9 as well as a motor 10, a supporting beam 11 on which the mirror 5, the objective 6 and the scanning device 7 are fastened along with a mirror 12 which is rotatable by means of a hinge 13. In addition to the illumination device 2, on the outer side of the casing a projection window 14, a keyboard 15, an electronics unit 16 and an electronic display 17 are provided.

The illumination device 2 is hinged and under it there is a circular opening 18 into which a circular socket 20 on the picture holder 3 can be inserted.

When using the image transmitter an image, which is contained in the picture holder 3, is projected from the illumination device 2 via the mirror 5 and the objective 6 onto the scanning device's 7 picture window 8 where it is scanned by means of the row scanner 9 in order to produce an electric signal. This signal can be used for the purposes of picture repreoduction.

Figure 2:
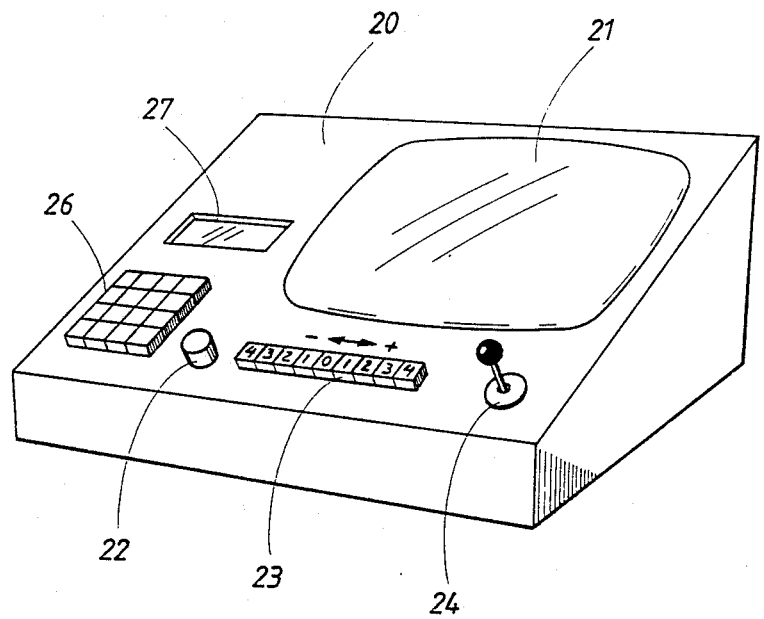
FIG. 2 shows an image processing device in accordance with the invention.

The electrical signal produced by means of the scanning device is stored in a memory which is used to render a representation of the picture on the display. This representation of the picture will be used as a basis for said correction of the illumination intensity of the image. An apparatus for such correction is shown in FIG. 2. This apparatus consists of a casing 20 with a display 21, in the form, e.g., of a cathode ray tube. Below the display 21 are a number of maneuver means: a dial 22 for adjusting the brightness of the image, a row of keys 23 for adjusting the degree of correction and a maneuver lever 24, i.e., a so called "joystick", for selecting the region to be corrected. Additional maneuver means such as start or stop keys 26 etc. as well as an indicator display 27 may be provided. The device contains necessary electronic equipment and is connected to or contains said memory in which the electronic image representation may be stored in such a way that a corresponding image can be produced on the display 21.

Figure 3:
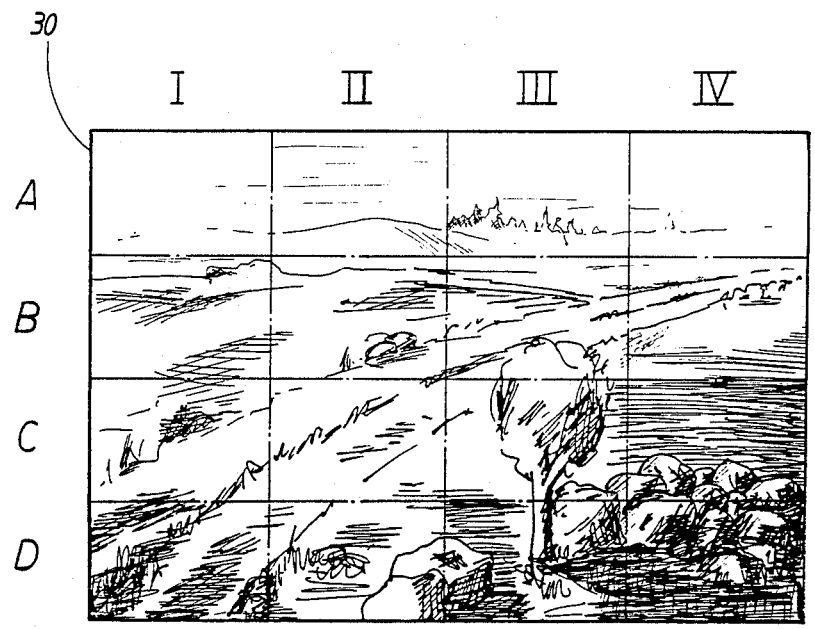
FIG. 3 shows an example of a picture representation which is taken as the starting point for the correction procedure in the image processing device.

For this purpose of example, FIG. 3 shows an image representation on the display 21. As may be seen, a picture surface is located within an outer border line 30. This is divided into a number of fields. In the present example 16 fields are shown, which are designated with reference to a coordinate system wherein the X-axis has the markings I–IV and the Y-axis the markings A–D. In the presentation of the image on the display the boundaries of the fields are marked but the markings should preferably not be visible except during maneuvers for corrections. In the present example, however, the division into fields is shown by means of broken lines for the purpose of facilitating the understanding of the following description only.

In FIG. 3 is shown an image on a picture surface within the border line 30 which represents a typical photographic picture, the subject of which was very unevenly illuminated. The upper-left field I A is consequently far too bright and the entire upper row A is in itself somewhat too bright. The lower-right field IV D is far too darkly shaded and even the fields I D, III D and IV C are darker than one would wish. It is assumed that other fields do not require any correction.

Figure 4:
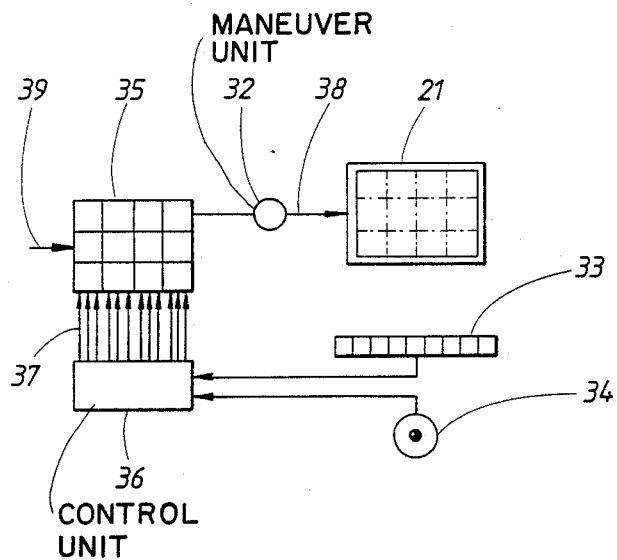
FIG. 4 shows a block diagram of the device in accordance with the invention.

FIG. 4 shows a schematic block diagram of the device such that the display 21, the maneuver means 32, which is connected to the dial 22, the maneuver means 33, which is connected to the keyboard 23 and the maneuver means 34, which is connected to the lever 24, are illustrated. Reference numeral 35 refers to a memory in which the image signal can be restored. As is illustrated schematically by means of a grid, the memory stores the image signal so that those sections which represent the different fields I A, etc., into which the image presentations are divided may be distinguished during processing. Reference numeral 36 designates a control unit which is connected to the maneuver means 33 and 34 and also to the memory 35 for separate processing of the various fields, which is indicated by means of a number of maneuver lines 37 between the control unit 36 and the memory 35. As will be seen, the maneuver means 32 is located in the line of communication 38 from the memory to the display. The line designated by reference numeral 39 illustrates that the image which is applied to the memory is stored under the direction of a signal from the scanning device of the aforementioned type.

Additional maneuver means and other equipment, e.g., equipment for controlling the sweep of the CRT over the display, if a CRT is used, are not shown as they are well known in the art and need no further description.

When an image is to be corrected or rather, to put it more exactly, when the representation of the signal is to be corrected, so that a correct image may be produced from same, the signal is applied to the memory 35. Based on the information in the memory 35 the image is presented on the display 21. Firstly, the desired average light intensity is adjusted by the means of the dial 22 which is connected to the control means 32. On photographic pictures the exposure is often adjusted in such a way that the central section of the picture, where the most important sections of the picture are usually located, is correctly exposed. The most usual case is therefore that the light is adjusted so that the middle section of the picture displays the desired brightness. In FIG. 3 the picture's middle section is also shown as being correct, needing no adjustment.

Thereafter, one determines which sections of the picture require correction so that they are made either darker or lighter. The field which is to be corrected is thereupon selected using the lever 24. A marker can be generated on the display which may be moved across the display by maneuvering the lever. The marker will indicate which field the control device 36 is to be directed to for correction in the memory. In the preceding description it has been assumed that the correction fields, i.e. the fields I A, etc., have fixed positions and even fixed size. As will be shown below this is not necessary, but the assumption is made in order to facilitate the description. Accordingly, if one decides to correct the field I A, which is far too bright, the lever 24 is maneuverd so that the marker is moved to this field on the display. Thereafter, one determines the degree of correction using the row of keys 23. In this example the row of keys has been shown as having four "minus" corrections and four "plus" corrections. In the present example assume that field I A requires correction corresponding to three levels of reduction in brightness. One therefore depresses the key marked minus three. The control unit 36 thereupon applies a correction to all of the picture elements within the field, the value of which will be described in greater detail below. For the fields II A and III A, which are somewhat too bright, one might, e.g., use the key minus one. For the field IV A, the value minus two might be suitable.

The lower section of the picture is too dark and in this region keys with positive values will consequently be used in a corresponding fashion. To indicate that a field is not to be changed, the key with the value zero can be used.

The device operates therefore in such a way that one moves said marker by means of the lever 24 so that changes in the corresponding field are registered by the control device 36 as a temporary change in the picture signal from the memory 35. When one of the keys in the key row 23 is depressed, a correction factor is registered, the value of which is determined in a fashion described below and is applied to the picture elements which are contained in the current field. Preferably, the signal stored in the memory is not changed but rather is augmented by a special control signal which indicates the correction factor for the picture elements within the current picture section. In this way additional corrections may easily be made in the picture if it does not seem satisfactory upon later examination.

If all of the picture elements within a field were to receive the same degree of correction while adjacent fields were not corrected in the same manner, the field in question would stand out from and would not blend into its surroundings. According to the invention, the control device 36 therefore does not assign the same correction factor to all of the picture elements within the field; instead, the value which has been entered, e.g., the correction minus three, is generally used only for the center section of the field. The correction factors for the peripheral sections of the field are calculated in the control device 36 so as to correspond to the correction factor for adjacent fields which in turn have peripheral picture elements adjusted to correspond to adjacent fields so that the correction factors for picture elements at the boundaries of adjacent fields are equal. From the boundaries of a field the correction factor will therefore increase or decrease smoothly to reach the value which has been set for the central portion of the field.

Figure 5:
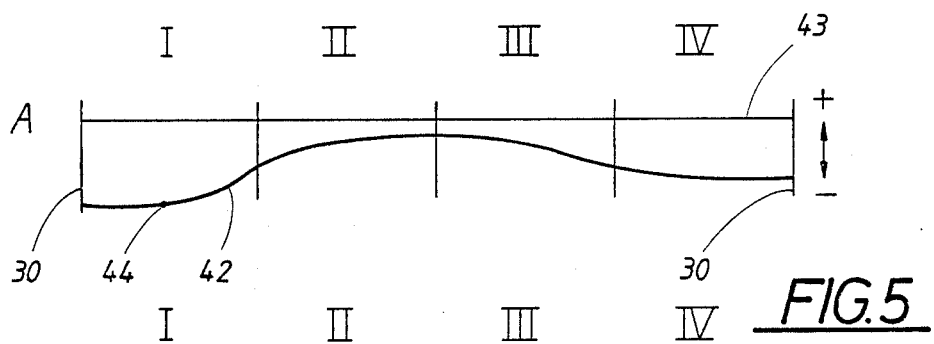
FIGS. 5 and 6 depict the correction principle in graph form.
Figure 6:
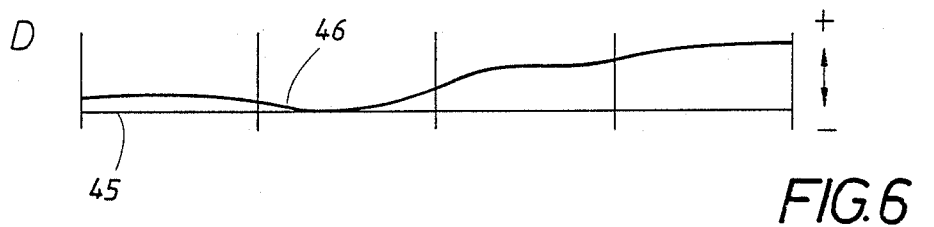

This is illustrated in FIGS. 5 and 6. The degree of correction is indicated by means of curve 42 in FIG. 5. The distance of the curve from the normal line 43, which represents a value corresponding to no correction, is proportional to the degree of correction required. FIG. 5 shows the correction for the central portion of the field row A. In the first field I a correction factor corresponding to three was selected. This value only applies to the midpoint 44 of the field. Since the field is a border field the correction may be applied all the way to the picture's border line 30 as is shown in FIG. 5.

The fields II and III required less correction and curve 42 therefore shows a value at the centers of the fields which represents the correction factor one. Finally, the field IV has a correction factor of two and the curve 42 represents this correction factor from the center of the field IV out to the border line 30. Between the midpoints of fields I and II, however, the curve 42 displays a smoothly and continuously decreasing correction factor in order to achieve a contourless transition between the correction factor three for the midpoint of field I and the correction factor one for the midpoint of field II. Since the midpoints of fields II and III have the same correction factor the curve 42 is generally straight between the midpoints of these fields. From the middle point of field III to the midpoint of field IV there is once again a smooth curve, representing a smooth transition between the correction factors in the actual picture.

In FIG. 6 is shown the field row D in which the brightness of the fields I, III and IV is to be increased. This is accomplished by applying positive correction factors measured from a normal curve 45 in accordance with the curve 46. As will be seen, curve 46 shows a low positive value at the midpoint of field I, a value of zero for the midpoint of field III, an intermediate plus value at the midpoint of field III and a high plus value at the midpoint of the field IV. Between the midpoints of the fields I and II, between the midpoints of fields II and III, and between the midpoints of fields III and IV the line shows a smooth transition. In this way the desired smooth transition in the level of correction is achieved. The method for obtaining successive values of the curve between two points which have different degrees of correction is consequently a form of interpolation.

Hitherto, the invention has been described as having fixed correction fields. It is, however, possible to provide the device with moveable or varying correction fields which may be moved over the surface of the picture by means of the lever 24. This would lead to greater correction possibilities since such a moveable field could be centered over the point where the correction is most adequate. An additional improvement may be obtained by allowing the size of a correction field to be changed so that it covers a little more than the picture field which is to be corrected. The correction field can be given a fixed shape—in FIG. 3 a rectangular shape has been shown—but other shapes may also be chosen or a shape which may be changed by a maneuver means e.g. from a circle to an ellipse with variable axis orientation.

It is also possible to increase the number of fixed, preset correction factors which may be chosen and to utilize a stepless sliding contact for adjustment of the correction factor, thereby allowing in essence a continuum of possible correction factors, preferbly in combination with a key or button for activating the value which has been chosen by the sliding contact.

I claim:

1. A device for selectively manipulating a representation of an image divided into a plurality of image fields; said device comprising:

display means, upon which the representation of the image is presented for viewing;

memory means electrically connected to said display means for storing the representation of the image as a set of memory blocks, each memory block corresponding to one of the image fields, and containing first, second and third brightness data signals;

the brightness of a central portion of each image field, presented on said display means, corresponding to the first brightness data signals contained in the corresponding memory block;

the brightness of a border portion of each image field, presented on said display means, corresponding to the second brightness data signals contained in the corresponding memory block;

the brightness of an intermediate portion of each image field, presented on said display means, corresponding to the third brightness data signals contained in the corresponding memory block; the intermediate portion lying between the central portion and the border portion of the corresponding image field;

a control unit electrically connected to said memory means;

selection means electrically connected to said control unit; and brightness modification means electrically connected to said control unit for generating brightness correction signals;

said selection means being adapted to direct said control unit to select for modification a chosen one of said memory blocks, whereby the control unit alters the first brightness data signals contained in the selected memory block by an amount corresponding to the brightness correction signals;

said control unit being adapted to modify the second and the third brightness data signals contained in the selected memory block, and in the memory blocks which are adjacent to the selected memory block, said modification consisting of interpolation between the first brightness data signals of the selected memory block and of the memory which are adjacent to the selected memory block.

2. A device according to claim 1, wherein the image fields are rectangular in shape.

* * * * *